US005130900A

United States Patent [19]

Makita

[11] Patent Number: 5,130,900

[45] Date of Patent: Jul. 14, 1992

[54] AUTOMOTIVE HEADLAMP

[75] Inventor: Hiroyuki Makita, Shizuoka, Japan

[73] Assignee: Koito Manufacturing Co., Ltd., Tokyo, Japan

[21] Appl. No.: 791,147

[22] Filed: Nov. 13, 1991

[30] Foreign Application Priority Data

Nov. 19, 1990 [JP] Japan ........ 2-311371

[51] Int. Cl.[5] ........ B60Q 1/04

[52] U.S. Cl. ........ 362/61; 362/304; 362/346

[58] Field of Search ........ 362/61, 80, 304, 297, 362/346

[56] References Cited

U.S. PATENT DOCUMENTS 1,775,619 9/1930 Whalen ........ 362/346 X 4,210,954 7/1980 Laser ........ 362/346 X 5,067,054 11/1991 Oshio et al. ........ 362/61

*Primary Examiner*—Stephen F. Husar

*Attorney, Agent, or Firm*—Sughrue, Mion, Zinn Macpeak & Seas

[57] ABSTRACT

An automotive headlamp in which a bulb is mounted in such a manner that its filament is positioned in the vicinity of the focus of a main reflector, and a sub-reflector for reflecting, in a predetermined forward direction, direct rays of light emitted slantingly forward from the bulb is provided in front of the bulb. The sub-reflector is supported by an attaching portion formed on a back surface of the sub-reflector and attached to the reflector. The main reflector and the sub-reflector have different focal lengths.

10 Claims, 4 Drawing Sheets

AUTOMOTIVE HEADLAMP

BACKGROUND OF THE INVENTION

The present invention relates to a automotive headlamp having a structure in which light emitted from a bulb is radiated in a forward direction of the vehicle by a reflector, and particularly relates to a automotive headlamp in which a sub-reflector is provided in addition to a main reflector.

As shown in FIG. 9, a conventional automotive headlamp has a structure in which a bulb 4 is provided in the vicinity of a focal position of a reflector 2 so that light emitted by the bulb 4 is reflected forward by the reflector. Reference numeral 6 designates a light shielding plate for shielding direct rays of light of the bulb which could be harmful.

The conventional headlamp, however, has a problem in that, since a portion of the direct rays of light emitted forward from the bulb is shielded by a shielding plate *6a*, the intensity of illumination of the headlamp is reduced. That is, there is a problem in that the direct rays of light emitted forward from the bulb are not effectively used.

Further, FIG. 10 shows another prior art headlamp (as disclosed in West German Patent No. 1801627) in which a sub-reflector *6b* is provided at a position in front of a bulb separately from a main reflector 2 so that the direct rays of light emitted forward from the bulb 4 are reflected in a predetermined forward direction through the sub-reflector *6b* so as to effectively use the light from the bulb's filament. In the sub-reflector system shown in FIG. 10, however, no way of attaching the sub-reflector *6b* to the main reflector 2 is specifically disclosed.

Further, there has been a problem in the following point. That is, in a automotive headlamp, it is necessary to provide a light-shielding member for shielding harmful light rays. Generally, such a light-shielding member is provided separately from a sub-reflector, and the light shielding member and the sub-reflector are mounted independently of each other. As a result, the number of parts required for the overall assembly is great, and the assembly work required for assembling the lamp is difficult.

SUMMARY OF THE INVENTION

The present invention has been attained in view of the problems in the prior art, and an object thereof is to provide a automotive headlamp in which direct rays of light emitted slantingly forward from a bulb are distributed in the forward of the headlamp by a sub-reflector to thereby obtain a strong intensity of illumination.

In order to attain the above and other objects, according to the present invention, there is provided an automotive headlamp in which a bulb is mounted in such a manner that its filament is positioned in the vicinity of the focus of a main reflector, and a sub-reflector for reflecting, in a predetermined forward direction, direct rays of light emitted slantingly forward from the bulb is provided in front of the bulb, is supported by means of an attaching portion formed on a rear surface of the sub-reflector and attached to the main reflector.

Conventionally, direct rays of light emitted forward from the bulb are shielded by a light-shielding member. According to the present invention, however, a part of the direct rays of light emitted forward from the bulb is reflected by the reflector and directed in the predetermined direction in the forward direction of the lamp so that substantially all the direct rays of light emitted forward from the bulb are effectively used.

Since the attaching portion formed on the rear surface of the sub-reflector is attached to the reflector, the sub-reflector can be integrated with the reflector.

DESCRIPTION OF THE PREFERRED EMBODIMENTS

Figure 1:
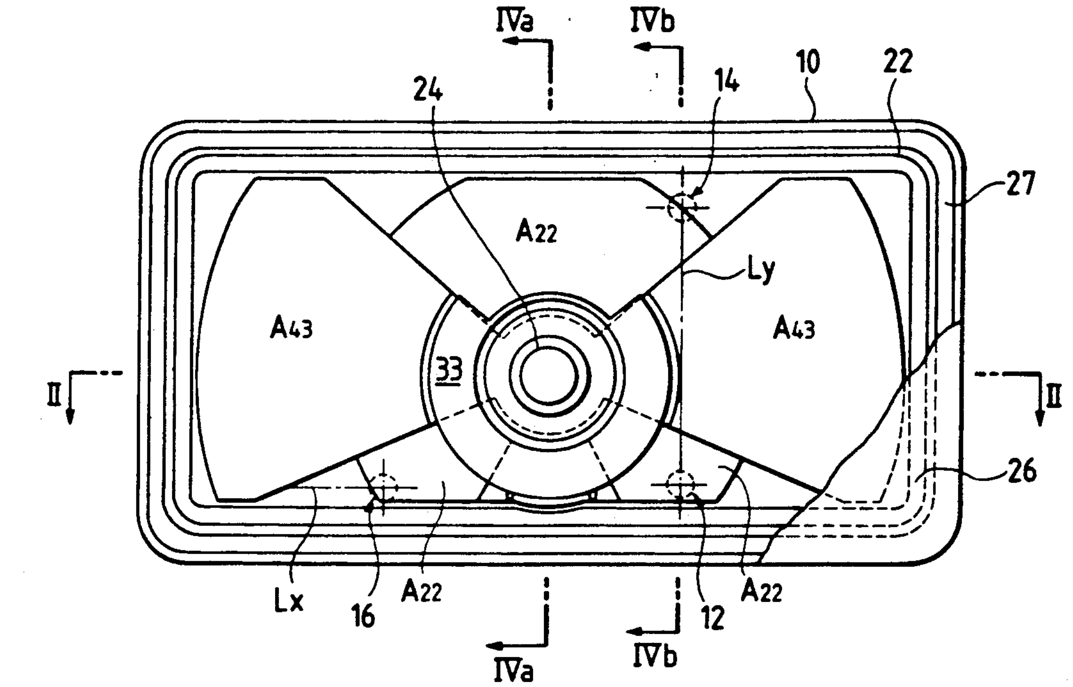
FIG. 1 is a front view of a headlamp constructed in accordance with a preferred embodiment of the present invention.

Referring to the drawings, preferred embodiments of the present invention will be described hereunder.

Figure 2:
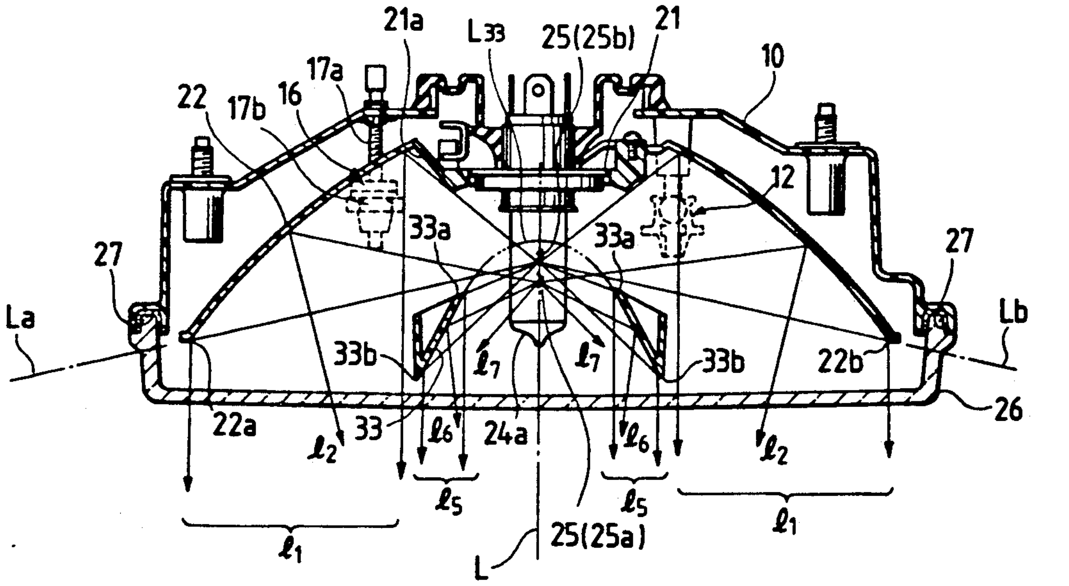
FIG. 2 is a horizontal sectional view of the headlamp.
Figure 3:
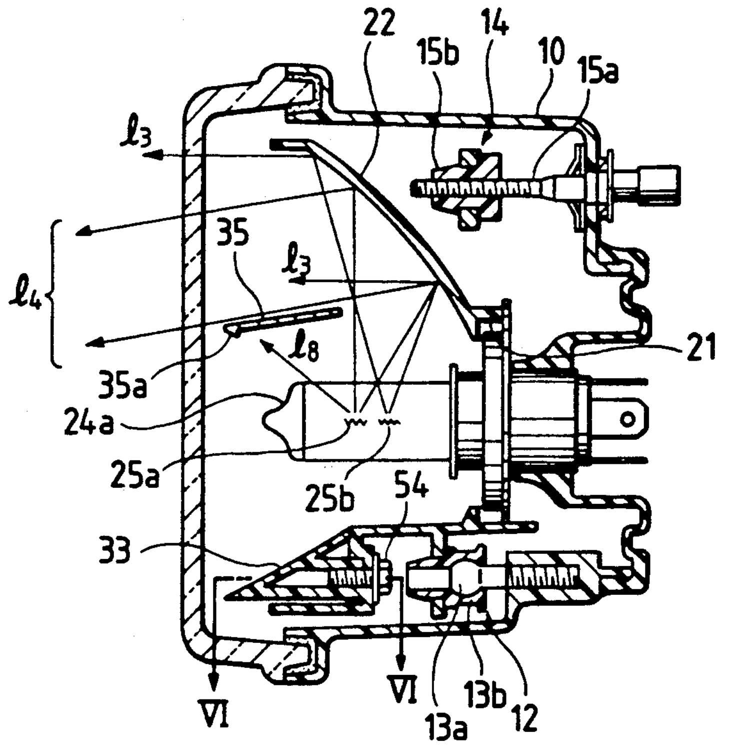
FIG. 3 is a vertical section of the headlamp.
Figure 4:
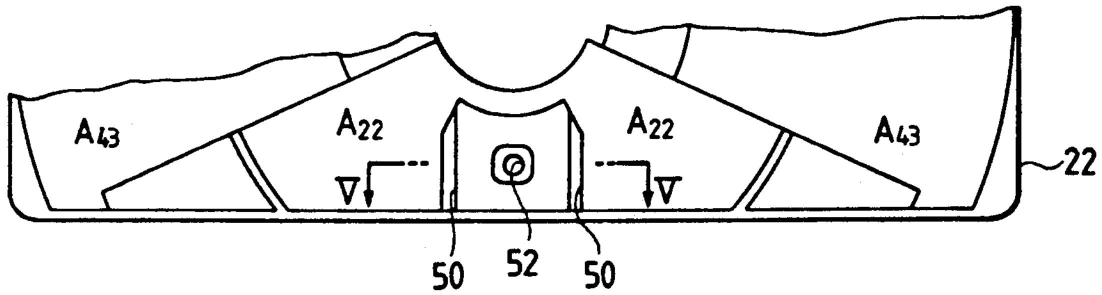
FIG. 4 is a front view of a main reflector showing the shape of a peripheral portion of a sub-reflector attaching portion.
Figure 5:
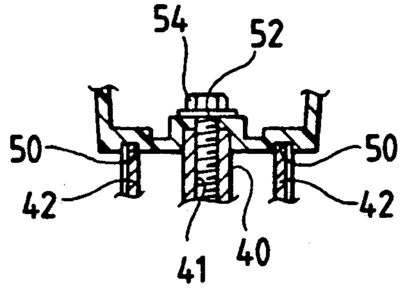
FIG. 5 is a horizontal section of an assembly portion of a sub-reflector and the main reflector of the headlamp of FIG. 1.
Figure 6:
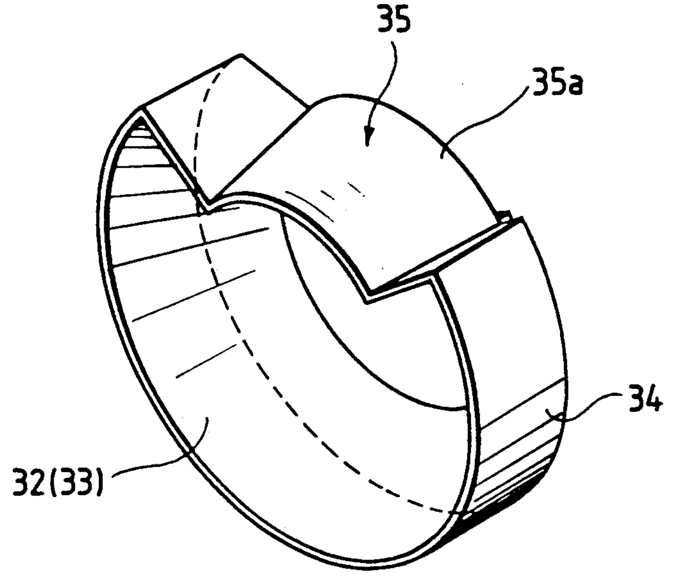
FIGS. 6 and 7 are perspective views of the sub-reflector.
Figure 7:
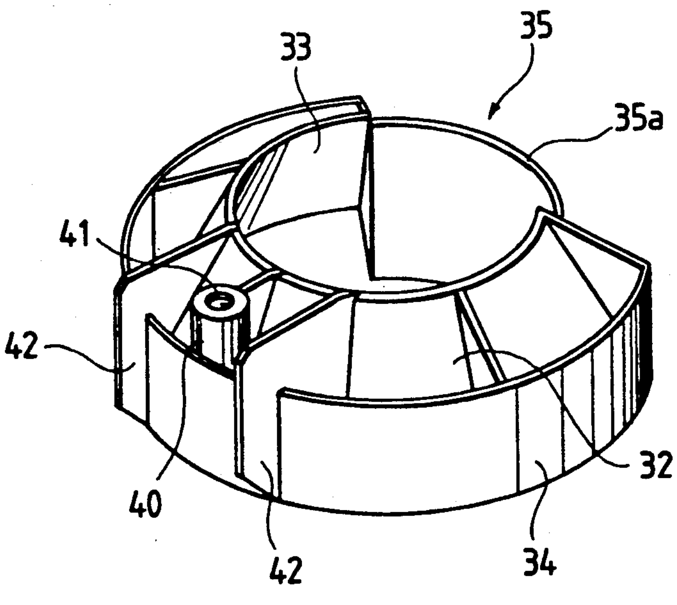
Figure 8:
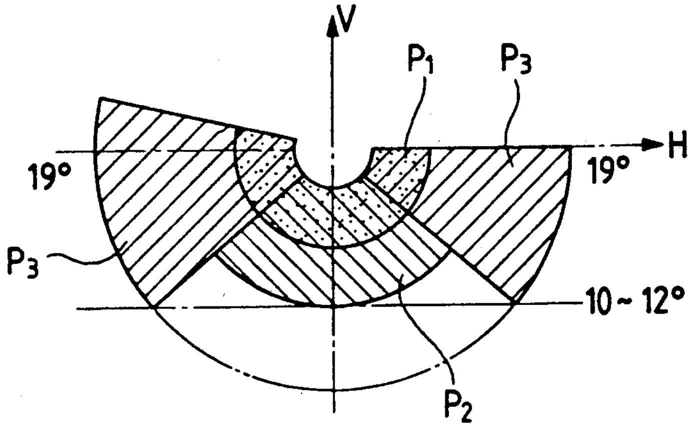
FIG. 8 is a diagram of a light distribution pattern of the sub-beam of the headlamp of the above embodiment.
Figure 9:
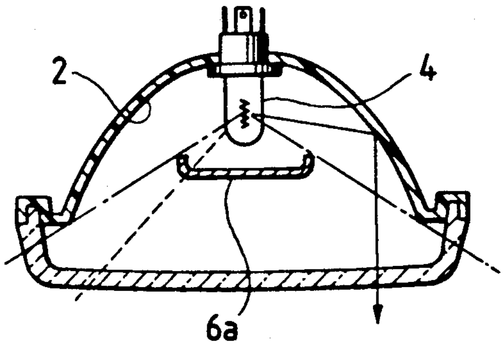
FIG. 9 PRIOR ART
FIGS. 9 and 10 are sectional views of respective prior art headlamps.
Figure 10:
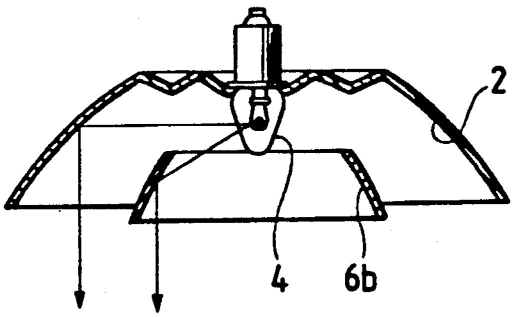
FIG. 10 PRIOR ART

FIGS. 1 through 8 show an automotive headlamp constructed in accordance with a preferred embodiment of the present invention, in which FIG. 1 is a front view of the headlamp in which a front lens is cut away, FIG. 2 is a horizontal sectional view of the headlamp (a sectional view taken on a line II—II in FIG. 1), FIG. 3 is a vertical sectional view of the headlamp (with the lamp body shown in a section taken on a line IIIa—IIIa in FIG. 1, and with the reflector shown in a section taken on a line IIIb—IIIb in FIG. 1), FIG. 4 is a front view of a main reflector showing the shape of the periphery of a sub-reflector attaching portion, FIG. 5 is a horizontal sectional view showing the structure in which the sub-reflector is assembled into the main reflector (a sectional view taken on a line V—V in FIG. 4), FIG. 6 is a perspective view of the sub-reflector viewed from its front side, FIG. 7 is a perspective view of the sub-reflector viewed from its back side, and FIG. 8 is a view showing a light-distribution pattern of a sub-beam of the headlamp.

In the drawings, reference numeral 10 designates a vessel-like lamp body which is rectangular in front view. A parabolic main-reflector 22 is supported by three points, that is, a swinging fulcrum 12, an up/down or vertical aiming point 14, and a left/right or horizontal aiming point 16, within the lamp body 10 The swinging fulcrum 12 has a universal joint structure (see FIG. 3) in which a ball joint *13a* projectingly provided on the lamp body 10 is engaged with a support portion *13b* on the reflector side. The vertical aiming point 14 and the horizontal aiming point 16 have structures in which aiming screws *15a* and 17 supported by a lamp-body back wall and extending in the forward/backward direction are engaged with respective nuts *15b* and *17b* on the reflector side. When the aiming screws *15a* and *17a* are rotated, the aiming points 14 and 16 are moved forward/backward, so that the reflector 22 is slantingly moved around a horizontal axis $L_x$ passing through the swinging fulcrum 12 and the aiming point 16 and around a vertical axis $L_y$ passing through the swinging fulcrum 12 and the aiming point 14. Accordingly, the tilt of a radiation axis L of the headlamp can be adjusted.

A bulb insertion hole 21 is formed in the lamp body 20 at its rear top portion, and a bulb 24 is inserted into the bulb insertion hole 21. The filament 25 of the bulb 24 has a double filament structure in which a filament 25*a* for a sub-beam and a filament 25*b* for a main beam are provided in the front and rear portions respectively. The main-beam filament 25*b* is set so as to be coincident with the focus position of a main reflector 22, specifically, a focus position of a reflector segment $A_{43}$, which is one of multiple light-reflecting surfaces (described in detail below). As indicated by reference symbol $l_1$ in FIG. 2, the light emitted from the main-beam filament 25*b* is reflected from the main reflector 22 so as to form a light beam substantially parallel to the optical axis L. The light is then radiated forward from the lamp through a front lens 26 integrally engaged with a front opening portion of the lamp body 10, so that a light-distribution pattern of a main (high) beam is formed. On the other hand, as depicted at reference symbol $l_2$ in FIG. 2, the light emitted from the sub-beam filament 25*a* is reflected on the main reflector 22 and directed forward in a direction so as to cross the optical axis L, and the light is then radiated forward from the lamp through the front lens 26 to thereby form a light-distribution pattern of a sub-beam (low beam).

A light-shielding coating 24*a* (called a "black top") is formed on the bulb at its forward end so as to block light radiated forward from the bulb to thereby prevent the generation of harmful light (direct rays of light emitted from the sub-beam filament in forming the sub-beam).

Further in FIGS. 1 and 2, reference numeral 27 designates a sealing groove formed along the circumferential edge of the front opening portion of the lamp body. The rim of the lens 26 is engaged with the sealing groove 27 through a sealing agent.

The main reflector 22 has a multi-reflecting-surface structure composed of two light-reflecting surfaces different in focal length F from each other, one being a reflector segment $A_{43}$ formed on the left and right sides of the bulb insertion hole 21 and having focal length F of not smaller than F28 (for example F43), the other being a reflector segment $A_{22}$ formed above and under the bulb insertion hole 21 and having an F value of 20–24, for example, F22. In the light-distribution pattern (the light-distribution pattern of the sub-beam) of the headlamp of the embodiment shown in FIG. 8, the reflector segment $A_{43}$ forms a central hot zone $P_1$, while the reflector segment $A_{22}$ forms a central lower zone $P_2$ of the pattern. Particularly, the focal length of the reflector segment $A_{22}$ is selected to be F22 so that the lower end of the lower zone $P_2$ is in a range of 10–12 degrees with respect to the vertical diffusion angle. Further, one portion (indicated by reference numeral 35*a*) of a sub-reflector 35 (which will be described below) is cut away so as to avoid blocking the distribution (see the reference symbols $l_3$ and $l_4$ in FIG. 3) of the light reflected on the reflector segments $A_{22}$. In FIG. 3, $l_3$ and $l_4$ designate rays of light which are emitted from the main-beam filament 25*b* and the sub-beam filament 25*a* and then reflected from the reflector segment $A_{22}$.

Reference numeral 35 designates the sub-reflector which is mounted in a region forward of the bulb 24 corresponding to a doughnut-like ineffective light reflecting surface segment 21*a* along the circumference of the bulb insertion hole 21 of the main reflector 22. Thus, the sub-reflector 30 reflects the direct rays of light emitted slantingly forward from the bulb 24 (see reference numerals $l_5$ and $l_6$ in FIG. 2) and directs the reflected light in the predetermined forward direction of the lamp.

As shown in FIGS. 6 and 7, the sub-reflector 35 is a substantially conical-frustum-like cylindrical body of synthetic resin partially cut away at its side portion. More specifically, the sub-reflector 35 is a molded body integrally composed of an inner cylindrical portion 32 having an inner circumferential surface on which an aluminum-deposition-treated light reflecting surface 33 and an outer cylindrical portion 34 which for reinforcing the inner cylindrical portion 32.

As shown in FIG. 2, a bulb-side inner circumferential edge 33*a* of the light reflecting surface 33 of the sub-reflector 35 is provided at a position slightly in front of straight lines $L_a$ and $L_b$ connecting the main-beam filament 25*b* and front-side left and right edge portions 22*a* and 22*b*, respectively, of the main reflector 22, while a front-side outer-circumferential edge 33*b* of the light reflecting surface 33 projects forward from the front edge of the bulb. The light reflecting surface 33 has a shape such that the surface 33 can reflect the direct rays of light emitted slantingly forward from the main-beam filament 25*b* (see reference symbol $l_5$ in FIG. 2) so as to direct the reflected light forward in a parallel beam. That is, the light reflecting surface 33 has a parabolic shape (see reference numeral $L_{33}$ in FIG. 2) in which the filament 25*b* is positioned at the focus of the light reflecting surface 33. In FIG. 2, reference symbol $l_6$ designates light emitted slantingly forward from the sub-beam filament 25*a* and reflected on the light reflecting surface 33. The focal length of the light reflecting surface 33 of the sub-reflector 35 is selected to be F8.

In use of the sub-beam filament 25*a*, as shown in FIG. 8, zones $P_3$ of diffusion light distributed at a horizontal diffusion angle of 19 degrees are obtained by the sub-reflector 35. A concave portion 35*a* is formed in the outer cylindrical portion 34 at its upper side surface, so that the sub-reflector 35 is shaped so as to be cut away at one portion thereof. When light emitted from the sub-beam filament 25*a* is reflected on the reflector segment $A_{22}$ of the main reflector 22, the light emitted from the sub-beam filament 25*a* is distributed forward without being shielded by the sub-reflector due to the formation of the concave portion 35*a* (see the reference symbol $l_4$ in FIG. 3) to thereby form the lower zone shown by $P_2$ in FIG. 8.

Of the light emitted by the sub-beam filament 25*a*, the light emitted slantingly forward without being shielded by the light-shielding coated portion 24*a* is shielded by the concave portion forming wall 35*a* of the sub-reflector 35, as shown by the reference symbol in FIG. 3, so that there is no possibility of generating glaring light. Further, the direct rays of light, which are indicated by reference symbol $l_7$ in FIG. 2 and which are not shielded by the light-shielding coating portion 24*a*, are sufficiently strong that the direct rays of light have no problem in forming the light-distribution pattern for the sub-beam.

Reference numeral 40 designates a boss portion which is projectingly provided on the sub-reflector 30 at its back side and which has a screw hole 41 formed therein. A pair of sub-reflector positioning and fixing ribs 42 and 42 are projectingly provided on the sub-reflector 30 at its back side so as to sandwich the boss portion 40. The ribs 42 are fitted in respective vertical grooves 50 and 50 formed in the main reflector 22. A screw insertion hole 52 is formed in the main reflector 22 at a position opposed to the screw hole 41 of the sub-reflector 30. A fastening screw 54 is inserted into the screw insertion hole 52 from the back side of the main reflector 22 and screwed into the screw hole 41 of the boss portion to thereby integrate the sub-reflector 30 with the main reflector 22. Since the positioning of the sub-reflector 30 relative to the main reflector 22 can be automatically performed by making the ribs 42 engage the vertical grooves 50, the assembly of the sub-reflector 30 with the main reflector 22 can be performed by screwing in only one screw 54, which can be accomplished in a simple manner and in a short time.

Although the main reflector 22 has a multiple reflecting-surface shape constituted by a plurality of light reflecting surfaces $A_{43}$ and $A_{22}$ having focal lengths different from each other in the embodiment described above, the present invention can be similarly applied to the case where the main reflector has a single light-reflecting surface shape having a single focal length.

As is apparent from the above description, a part of the direct rays of light emitted forward from the bulb is reflected by the sub-reflector and directed in the predetermined forward direction from the lamp in the automotive headlamp according to the present invention, whereas in the conventional case the whole of the direct rays of light emitted forward from the bulb is shielded by the shielding member. According to the present invention, therefore, the intensity of illumination of the headlamp is made greater. Because the intensity of illumination is strong, even if the depth and vertical width of the lamp is made small, sufficient intensity of illumination can be assured, so that the present invention has an effect that it is possible to cope with a variety of lamp shapes and limitations imposed by the vehicle body, for example, a small installation space for the lamp housing.

Further, the sub-reflector can be simply integrated with the reflector by mounting the attaching portion of the back surface of the sub-reflector to the reflector, so that the sub-reflector can be easily assembled.

What is claimed is:

1. An automotive headlamp comprising: a curved main reflector; a bulb having a filament positioned substantially at a focus of said main reflector; and a sub-reflector for reflecting direct rays of light emitted in a slanting direction forward from said bulb in a predetermined forward direction of said headlamp, said sub-reflector comprising an attaching portion formed on a rear surface of said sub-reflector for attaching said sub-reflector to said reflector.

2. The automotive headlamp of claim 1, wherein said sub-reflector comprises a substantially conical-frustum-like cylindrical body made of a synthetic resin partially cut away in a side portion thereof.

3. The automotive headlamp of claim 2, wherein said cylindrical body comprises an inner cylindrical portion and an outer cylindrical portion reinforcing said inner cylindrical portion, said inner cylindrical portion having a reflective coating formed on an inner circumferential surface thereof.

4. The automotive headlamp of claim 2, wherein said main reflector comprises a plurality of reflector segments of respective different focal lengths.

5. The automotive headlamp of claim 4, wherein said reflector segments comprise a pair of segments for forming a central hot zone and a segment forming a central lower zone of a main beam of light reflected from said main reflector.

6. The automotive headlamp of claim 5, wherein the partially cut-away side portion of said reflector is shaped to avoid blocking light reflected from said segment forming said central lower zone.

7. The automotive headlamp of claim 5, wherein said attaching portion of said sub-reflector is attached to said segment forming said central lower zone.

8. The automotive headlamp of claim 1, wherein said bulb is inserted into said main reflector through a bulb insertion hole formed in a rear portion of said main reflector, said sub-reflector covering a generally annular-shaped ineffective light reflecting surface range formed around said bulb insertion hole.

9. The automotive headlamp of claim 1, wherein said sub-reflector has a parabolic reflecting surface, a sub-beam filament of said bulb being positioned substantially at a focus of said parabolic reflecting surface.

10. The automotive headlamp of claim 1, wherein said attaching portion comprises a boss portion having a screw hole formed therein, a pair of ribs sandwiching said boss portion, said ribs being received in respective vertical grooves formed in said main reflector, and a screw inserted into said screw hole for fastening said attaching portion to said main reflector.

* * * * *